US012737564B2

(12) United States Patent
Shou et al.

(10) Patent No.: US 12,737,564 B2
(45) Date of Patent: Sep. 15, 2026

(54) REPRESENTATION LEARNING OF CROSS-LANGUAGE TEXTS

(71) Applicant: Microsoft Technology Licensing, LLC, Redmond, WA (US)

(72) Inventors: Linjun Shou, Beijing (CN); Ming Gong, Beijing (CN); Daxin Jiang, Beijing (CN); Duyu Tang, Beijing (CN); Zhijie Sang, Beijing (CN); Xingyao Zhang, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 18/547,325

(22) PCT Filed: Mar. 7, 2022

(86) PCT No.: PCT/US2022/019063

§ 371 (c)(1),
(2) Date: Aug. 21, 2023

(87) PCT Pub. No.: WO2022/203840

PCT Pub. Date: Sep. 29, 2022

(65) Prior Publication Data

US 2024/0185003 A1 Jun. 6, 2024

(30) Foreign Application Priority Data

Mar. 22, 2021 (CN) ......................... 202110302025.7

(51) Int. Cl.
*G06F 40/58* (2020.01)
*G06F 40/211* (2020.01)

(52) U.S. Cl.
CPC ........... *G06F 40/58* (2020.01); *G06F 40/211* (2020.01)

(58) Field of Classification Search
CPC ........ G06F 40/58; G06F 40/211; G06F 40/45; G06F 40/44; G06F 40/30
See application file for complete search history.

(56) References Cited

U.S. PATENT DOCUMENTS

2017/0315986 A1 11/2017 Akbik
2022/0051080 A1* 2/2022 Hajarnis ............... G06F 40/194
(Continued)

FOREIGN PATENT DOCUMENTS

CN 111274813 A 6/2020
CN 112084295 A 12/2020
(Continued)

OTHER PUBLICATIONS

Xie et al., "A contextual alignment enhanced cross graph attention network for cross-lingual entity alignment." Proceedings of the 28th International Conference on Computational Linguistics. 2020 (Year: 2020).*

(Continued)

*Primary Examiner* — Bhavesh M Mehta
*Assistant Examiner* — Jangwoen Lee
(74) *Attorney, Agent, or Firm* — Schwegman Lundberg & Woessner, P.A.

(57) ABSTRACT

The present disclosure proposes a method and apparatus for representation learning of cross-language texts. A source language text and a target language text may be obtained. An initial joint representation of the source language text and the target language text may be generated. Relations among a plurality of words in the source language text and the target language text may be identified. A joint representation of the source language text and the target language text may be generated based on the initial joint representation and the
(Continued)

relations. The joint representation may be projected to at least a target language representation corresponding to the target language text.

18 Claims, 9 Drawing Sheets

(56) References Cited

U.S. PATENT DOCUMENTS

2022/0075945 A1* 3/2022 Zhang .................. G06F 40/284
2022/0138440 A1* 5/2022 Li .......................... G06F 40/58
704/2

FOREIGN PATENT DOCUMENTS

CN 112131404 A 12/2020
WO 2020242567 A1 12/2020
WO WO-2022203840 A1 9/2022

OTHER PUBLICATIONS

Conneau, et al., "Cross-lingual language model pretraining." Advances in neural information processing systems 32, 2019 (Year: 2019).*
He et al., "BERT-MK: Integrating graph contextualized knowledge into pre-trained language models." Findings of the Association for Computational Linguistics: EMNLP 2020, 2020 (Year: 2020).*
Clark, et al., "Tydi QA: A Benchmark for Information-Seeking Question Answering in Typologically Diverse Languages", In Transactions of the Association for Computational Linguistics, vol. 8, Jul. 1, 2020, pp. 454-470.
Conneau, et al., "Unsupervised Cross-lingual Representation Learning at Scale", In Proceedings of the 58th Annual Meeting of the Association for Computational Linguistics, Jul. 5, 2020, pp. 8440-8451.
Cui, et al., "Cross-Lingual Machine Reading Comprehension", In Proceedings of the Conference on Empirical Methods in Natural Language Processing and the 9th International Joint Conference on Natural Language Processing, Nov. 3, 2019, pp. 1586-1595.
Devlin, et al., "BERT: Pre-training of Deep Bidirectional Transformers for Language Understanding", In Proceedings of the Conference of the North American Chapter of the Association for Computational Linguistics: Human language Technologies, Jun. 2, 2019, pp. 4171-4186.
Fang, et al., "FILTER: An Enhanced Fusion Method for Cross-lingual Language Understanding", In Repository of arXiv:2009.05166v3, Dec. 15, 2020, 11 Pages.
Hu, et al., "Reinforced Mnemonic Reader for Machine Reading Comprehension", In Repository of arXiv:1705.02798v6, Jun. 6, 2018, 8 Pages.
Hu, et al., "XTREME: A Massively Multilingual Multi-task Benchmark for Evaluating Cross-lingual Generalization", In International Conference on Machine Learning, Nov. 21, 2020, 11 Pages.
Huang, et al., "Unicoder: A Universal Language Encoder by Pre-training with Multiple Cross-lingual Tasks", In Proceedings of the Conference on Empirical Methods in Natural Language Processing and the 9th International Joint Conference on Natural Language Processing, Nov. 3, 2019, pp. 2485-2494.
Joshi, et al., "TriviaQA: A Large Scale Distantly Supervised Challenge Dataset for Reading Comprehension", In Proceedings of the 55th Annual Meeting of the Association for Computational Linguistics, vol. 1, Long Papers, Jul. 30, 2017, pp. 1601-1611.
Conneau, et al., "Cross-lingual Language Model Pretraining", In Proceedings of Advances in Neural Information Processing Systems, Jan. 22, 2019, pp. 1-11.
Lewis, et al., "BART: Denoising Sequence-to-Sequence Pre-training for Natural Language Generation, Translation, and Comprehension", In Repository of arXiv:1910.13461v1, Oct. 29, 2019, 10 Pages.
Lewis, et al., "MLQA: Evaluating Cross-lingual Extractive Question Answering", In Repository of arXiv:1910.07475v3, May 3, 2020, 16 Pages.
Li, et al., "MTOP: A Comprehensive Multilingual Task-Oriented Semantic Parsing Benchmark", In Repository of arXiv:2008.09335v1, Aug. 21, 2020, 10 Pages.
Li, et al., "Unsupervised Cross-lingual Adaptation for Sequence Tagging and Beyond", In Repository of arXiv:2010.12405v1, Oct. 23, 2020, 14 Pages.
Liang, et al., "XGLUE: A New Benchmark Dataset for Cross-lingual Pre-training, Understanding and Generation", In Repository of arXiv:2004.01401v3, May 22, 2020, 11 Pages.
Liu, et al., "Cross-lingual Machine Reading Comprehension with Language Branch Knowledge Distillation", In Proceedings of the 28th International Conference on Computational Linguistics, Dec. 8, 2020, pp. 2710-2721.
Nguyen, et al., "MS MARCO: A Human Generated MAchine Reading COmprehension Dataset", In Repository of arXiv:1611.09268v1, Nov. 28, 2016, pp. 1-10.
Och, et al., "A Systematic Comparison of Various Statistical Alignment Models", In Journal of Computational Linguistics, vol. 29, Issue 1, Mar. 1, 2003, pp. 19-51.
Puri, et al., "Training Question Answering Models From Synthetic Data", In Repository of arXiv:2002.09599v1, Feb. 22, 2020, 13 Pages.
Qi, et al., "Stanza: A Python Natural Language Processing Toolkit for Many Human Languages", In Proceedings of the 58th Annual Meeting of the Association for Computational Linguistics, Jul. 5, 2020, pp. 101-108.
Rajpurkar, et al., "Know What You Don't Know: Unanswerable Questions for SQUAD", In Repository of arXiv:1806.03822v1, Jun. 11, 2018, 9 Pages.
Rajpurkar, et al., "SQuAD: 100,000+ Questions for Machine Comprehension of Text", In Proceedings of the Conference on Empirical Methods in Natural Language Processing, Nov. 1, 2016, pp. 2383-2392.
Riabi, et al., "Synthetic Data Augmentation for Zero-Shot Cross-lingual Question Answering", In Repository of arXiv:2010.12643v1, Oct. 23, 2020, 10 Pages.
Schuster, et al., "Cross-Lingual Transfer Learning for Multilingual Task Oriented Dialog", In Proceedings of NAACL-HLT, Oct. 31, 2018, 11 Pages.
Seo, et al., "Bi-Directional Attention Flow for Machine Comprehension", In Repository of arXiv:1611.01603v5, Feb. 24, 2017, pp. 1-13.
Shakeri, et al., "Multilingual Synthetic Question and Answer Generation for Cross-Lingual Reading Comprehension", In Repository of arXiv:2010.12008v1, Oct. 22, 2020, 7 Pages.
Siddhant, et al., "Evaluating the Cross-Lingual Effectiveness of Massively Multilingual Neural Machine Translation", In Repository of arXiv:1909.00437v1, Sep. 1, 2019, 13 Pages.
Upadhyay, et al., "(Almost) Zero-Shot Cross-Lingual Spoken Language Understanding", In Proceedings of the IEEE International Conference on Acoustics, Speech and Signal Processing, Apr. 15, 2018, pp. 6034-6038.
Vaswani, et al., "Attention is All you Need", In Proceedings of 31st Conference on Neural Information Processing Systems, Dec. 4, 2017, pp. 1-11.
Veličković, et al., "Graph Attention Networks", In Repository of arXiv:1710.10903v3, Feb. 4, 2018, pp. 1-12.
Wolf, et al., "Huggingface's Transformers: State-of-the-Art Natural Language Processing", In Repository of arXiv:1910.03771v1, Oct. 9, 2019, 11 Pages.
Wu, et al., "Google's Neural Machine Translation System: Bridging the Gap Between Human and Machine Translation", In repository of arXiv, arXiv:1609.08144v1, Sep. 26, 2016, pp. 1-23.
Xu, et al., "End-to-End Slot Alignment and Recognition for Cross-Lingual NLU", In Proceedings of Conference on Empirical Methods in Natural Language Processing, Nov. 16, 2020, pp. 5052-5063.
Yu, et al., "QANet: Combining Local Convolution with Global Self-Attention for Reading Comprehension", In Proceedings of the 6th International Conference on Learning Representations, Apr. 30, 2018, 16 Pages.

(56) References Cited

OTHER PUBLICATIONS

Yuan, et al., "Enhancing Answer Boundary Detection for Multilingual Machine Reading Comprehension", In Proceedings of the 58th Annual Meeting of the Association for Computational Linguistics, Jul. 5, 2020, pp. 925-934.
Zeng, et al., "A Survey on Machine Reading Comprehension-Tasks, Evaluation Metrics and Benchmark Datasets", In Journal of Applied Sciences, vol. 10, Issue 21, Oct. 29, 2020, pp. 1-57.
Zhang, et al., "SG-Net: Syntax-Guided Machine Reading Comprehension", In Repository of arXiv:1908.05147v3, Nov. 20, 2019, 9 Pages.
Zhu, et al., "NCLS: Neural Cross-Lingual Summarization", In Repository of arXiv:1909.00156v1, Aug. 31, 2019, 11 Pages.
Zhu, et al., "Retrieving and Reading: A Comprehensive Survey on Open-domain Question Answering", In Repository of arXiv:2101.00774v3, May 8, 2021, pp. 1-21.
Wang, et al., "Multi-perspective Context Matching for Machine Comprehension", In Repository of arXiv:1612.04211v1, Dec. 16, 2016, 8 Pages.
Xu, et al., "A Graph Fusion Approach for Cross-Lingual Machine Reading Comprehension", In Proceedings of the 37th AAAI Conference on Artificial Intelligence, vol. 37, Issue 11, Jun. 26, 2023, pp. 13861-13868.
"International Application No. PCT/US2022/019063, International Search Report dated Jun. 24, 2022", (Jun. 24, 2022), 4 pgs.
"International Application No. PCT/US2022/019063, Written Opinion of the International Search Authority dated Jun. 24, 2022", (Jun. 24, 2022), 7 pgs.
Bastings, Jasmijn, et al., "Graph Convolutional Encoders for Syntax-aware Neural Machine Translation", arxiv.org, Cornell University Library, 201 Olin Library, Cornell university, Ithaca, NY 14853, XP080763265, DOI: 10.18653/V1/D17-1209, (Apr. 15, 2017), 11 pgs.
Ding, Liang, et al., "Self-Attention with Cross-Lingual Position Representation", arXiv:2004.13310 [cs.CL]; (or arXiv:2004.13310v4 [cs.CL] for this version); https://doi.org/10.48550/arXiv.2004.13310, (Apr. 28, 2020), 7 pgs.
Klein, Guillaume, et al., "OpenNMT: Open-Source Toolkit for Neural Machine Translation", XP055930014; retrieved from Internet: URL: https://arxiv.org/pdf/1701.02810v1.pdf, (Jan. 10, 2017), 5 pgs.
Sachan, Devendra Singh, "Do Syntax Trees Help Pre-trained Transformers Extract Information?", arXiv:2008.09084 [cs.CL]; (or arXiv:2008.09084v2 [cs.CL] for this version); https://doi.org/10.48550/arXiv.2008.09084, (Aug. 20, 2020), 15 pgs.
Zenkel, Thomas, et al., "End-to-End Neural Word Alignment Outperforms GIZA++", arXiv:2004.14675 [cs.CL] ; (or arXiv:2004.14675v1 [cs.CL] for this version); https://doi.org/10.48550/arXiv.2004.14675, (Apr. 30, 2020), 13 pgs.
Zhang, Meishan, et al., "Cross-Lingual Dependency Parsing Using Code-Mixed TreeBank", arXiv:1909.02235 [cs.CL]; (or arXiv:1909.02235v1 [cs.CL] for this version); https://doi.org/10.48550/arXiv.1909.02235, (Sep. 5, 2019), 10 pgs.
Notice of Grant Received for Chinese Application No. 202110302025.7, mailed on Nov. 20, 2024, 08 pages (English Translation Provided).
Ding et al., "Self-Attention with Cross-Lingual Position Representation," arXiv:2004.13310v4 [cs.CL], Nov. 21, 2020, 8 pages.
Mao, et al., "MRAEA: An Efficient and Robust Entity Alignment Approach for Cross-lingual Knowledge Graph," Technical presentation, Feb. 2020, 9 pages.
Notice of First Examination Received for Chinese Application No. 202110302025.7, mailed on Jun. 1, 2024, 16 pages (English Translation Provided).

* cited by examiner 300
302
protect
Source Language Node
304
306
308
310
we
should
environment
the
312
314
316
318
wir
sollten
Umwelt
die
Target Language Node
schützen
320

REPRESENTATION LEARNING OF CROSS-LANGUAGE TEXTS

PRIORITY CLAIM TO RELATED APPLICATIONS

This application is a U.S. national stage filing under 35 U.S.C. § 371 from International Application No. PCT/US2022/019063, filed on Mar. 7, 2022, and published as WO2022/203840 on Sep. 29, 2022, which claims the benefit under 35 U.S.C. 119 to Chinese Application No. 202110302025.7, filed on Mar. 22, 2021, the benefit of priority of each of which is claimed herein, and which applications and publication are hereby incorporated herein by reference in their entirety.

BACKGROUND

Natural Language Understanding (NLU) is a technology that uses natural language to communicate with computers, which aims to enable computers to understand and use a natural language to achieve communication between humans and computers, thereby replacing humans to perform various tasks related to the natural language, e.g., a machine reading comprehension task, a classification task, a question answering task, etc. A NLU task may be performed through a trained machine learning model. A performance of the machine learning model to perform the NLU task depends on a large amount of reliable training data. For resource-rich languages such as English, there are large-scale human-labeled training data for some NLU tasks. Therefore, these NLU tasks have outstanding performance for the resource-rich languages.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose a method and apparatus for representation learning of cross-language texts. A source language text and a target language text may be obtained. An initial joint representation of the source language text and the target language text may be generated. Relations among a plurality of words in the source language text and the target language text may be identified. A joint representation of the source language text and the target language text may be generated based on the initial joint representation and the relations. The joint representation may be projected to at least a target language representation corresponding to the target language text.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in conjunction with the appended drawings that are provided to illustrate and not to limit the disclosed aspects.

DETAILED DESCRIPTION

Figure 1:
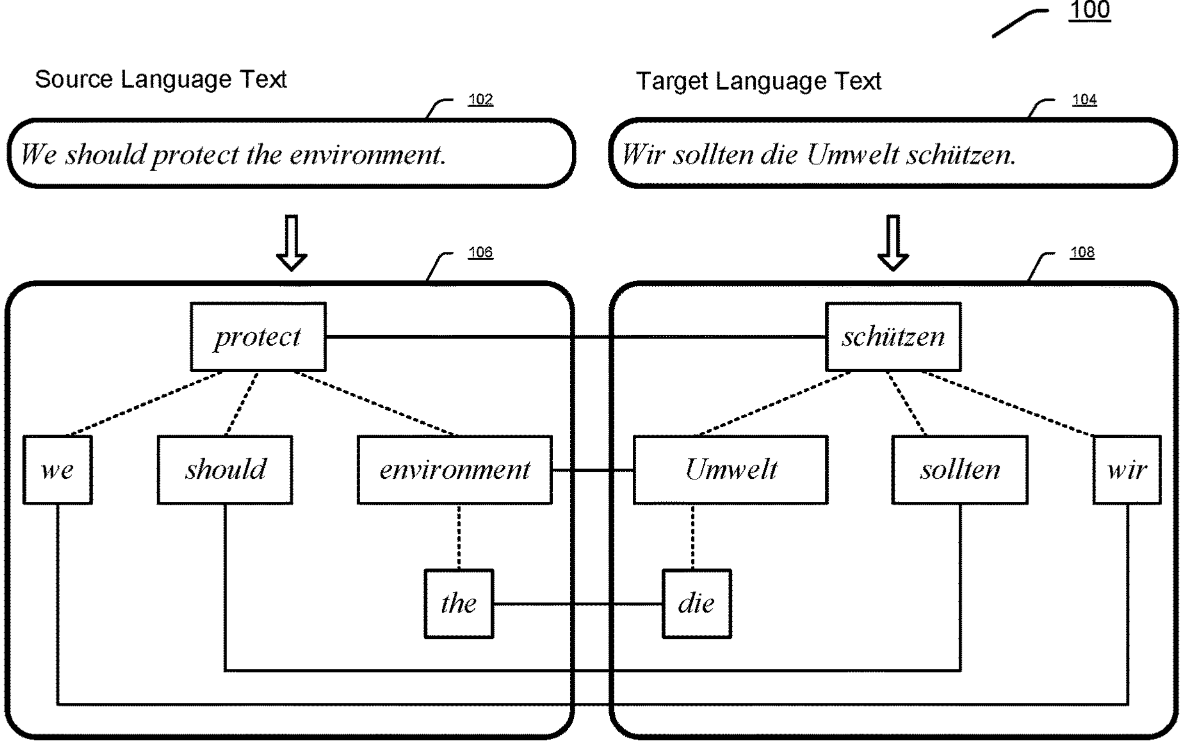
FIG. 1 is a schematic diagram illustrating an exemplary source language text, an exemplary target language text and exemplary relations among them according to an embodiment of the present disclosure.

The present disclosure will now be discussed with reference to several exemplary implementations. It is to be understood that these implementations are discussed only for enabling those skilled in the art to better understand and thus implement the embodiments of the present disclosure, rather than suggesting any limitations on the scope of the present disclosure.

It is desired to extend NLU tasks such as a machine reading comprehension task, a classification task, a question answering task, etc., to resource-scarce languages, such as German, Spanish, French, etc. However, for the resource-scarce languages, there is little or no reliable training data, which restricts the performance of machine learning models when performing the NLU tasks for resource-scarce languages. The problem of lack of training data for the resource-scarce languages may be solved through cross-lingual NLU. The cross-language NLU may transfer knowledge acquired from texts in resource-rich languages to texts in resource-scarce languages with the aid of machine translation, to help enhance the understanding of texts in the resource-scarce languages, thereby may obtaining more accurate representations of the texts in the resource-scarce languages, and further improving the performance of the NLU task for the texts in the resource-scarce languages. Herein, a resource-rich language that provides knowledge may be referred to as a source language, and a resource-scarce language that learns knowledge may be referred to as a target language. Accordingly, a text in a source language may be referred to as a source language text, and a text in a target language may be referred to as a target language text. There are some existing cross-lingual NLU methods. For example, training data in the source language for a specific NLU task may be translated into training data in the target language, and the translated training data in the target language may be used to train a machine learning model. When the trained machine learning model is actually deployed, a representation of the target language text may be generated and the specific NLU task may be performed with the generated representation.

Embodiments of the present disclosure propose an improved method for obtaining a representation of a target language text through cross-lingual NLU. Herein, a representation may refer to a collection of information that is generated based on raw data and in a form that is conducive to be processed by a machine learning model. A source language text and a target language text may be obtained, a joint representation of the source language text and the target language text may be generated based on relations among a plurality of words in the source language text and the target language text, and the joint representation may be projected to a representation corresponding to the source language text and/or a representation corresponding to the target language text. Herein, a word may broadly refer to a basic language unit that constitutes texts in different languages, and relations among words may refer to associations among the words based on predetermined criteria. Relations among a plurality of words in the source language text and the target language text may include, e.g., alignment relations among words in the source language text and words in the target language text. Two words that have an alignment relation may usually have similar semantic meaning. Considering the alignment relation when generating a joint representation of the source language text and the target language text may facilitate to understand the semantics of each word in the source language text and the target language text. In addition, the relations among the plurality of words in the source language text and the target language text may include dependency relations related to a syntax structure of each text, e.g., dependency relations among a plurality of words in the source language text and dependency relations among a plurality of words in the target language text. The correct alignment relations between the source language text and the target language text may be found with the aid of the dependency relations. Considering the alignment relations and dependency relations when generating the representations of the source language text and the target language text may enhance the knowledge transfer between the source language text and the target language text, to generate a better joint representation of the source language text and the target language text, thereby obtaining a more accurate representation corresponding to the source language text and/or a more accurate representation corresponding to the target language text. Through the method according to the embodiments of the present disclosure, both the representation of the source language text and the representation of the target language text may be improved, thus this method may also be referred to as a representation learning method of cross-language texts. The representation of the source language text and/or the representation of the target language text may be further used to perform various NLU tasks. When performing tasks with the source language representation and/or target language representation, a more accurate representation may facilitate to obtain a more accurate result.

In an aspect, an embodiment of the present disclosure proposes to explicitly model a plurality of words in a source language text and a target language text and relations among the plurality of words though constructing a graph corresponding to the source language text and the target language text, thereby semantic associations among these words may be better captured. In the graph, the words in the source language text and the target language text may be represented through nodes, and the relations among the words may be represented through edges among the nodes. The edges among the nodes may correspond to the relations among the words. For example, when a relation between two words is an alignment relation, an edge between two nodes corresponding to the two words may be an alignment edge; and when a relation between two words is a dependency relation, an edge between two nodes corresponding to the two words may be a dependency edge. Herein, a node having an edge with a current node may be referred to as a neighbor node of the current node. For example, a node having an alignment edge with a current node may be an alignment neighbor node of the current node, and a node having a dependency edge with a current node may be a dependency neighbor node of the current node. Since the graph corresponding to the source language text and the target language text constructed according to the embodiments of the present disclosure integrates the dependency relations related to the syntax structure and the alignment relations, the graph may also be referred to as a Syntax-Enhanced and Alignment-Aware graph, abbreviated as a SA graph.

In another aspect, an embodiment of the present disclosure proposes to obtain a representation of at least one neighbor node of each node corresponding to each word in a source language text and a target language text when obtaining a representation of the source language text and a joint representation of the target language text, and update a representation of a node with the obtained representation of the at least one neighbor node, wherein representations of various node may be combined into the joint representation. The neighbor nodes may be identified from the SA graph. In this way, intrinsic semantic associations among neighboring nodes may be propagated via the edge connections in the SA graph, which facilitates to generate a more accurate representation of each node.

In yet another aspect, an embodiments of the present disclosure proposes that when updating a representation of a node with a representation of a neighbor node, if the neighbor node is a neighbor node with an alignment edge with the node, the representation of the node may be updated based on a semantic difference between the neighbor node and the node. For example, when the semantic difference between the neighbor node and the node is large, e.g., when there is an alignment error, a weight of the representation of the neighbor node may be reduced when the representation of the node is being updated, thereby, the impact caused by the alignment error may be alleviated. In addition, when the neighbor node is a neighbor node with a dependency edge with the node, the representation of the node may be updated based on an importance of the neighbor node relative to the node. For example, if the neighbor node is important relative to the node, when the representation of the node is being updated, a greater weight corresponding to the representation of the neighbor node may be given, so that more consideration may be given to the representation of the neighbor node when the representation of the node is being updated.

In still another aspect, an embodiment of the present disclosure proposes to obtain a representation of a source language text and a representation of a target language text through a model based on deep learning, and proposes to a pre-training strategy to guide the model to be able to learn a text representation from semantic associations such as alignment relations embedded in between a source language text and a target language text, dependency relations among a plurality of words in the source language text, and the dependency relations among a plurality of words in the target language text. Herein, a model used to obtain a representation of a source language text and a representation of a target language text may be referred to as a representation obtaining model. In a pre-training strategy, a representation obtaining model may be pre-trained through masking one or more nodes in one node set of a source language node set corresponding to the source language text sample and a target language node set corresponding to the target language text sample; and for each node, recovering the node with at least the representation of a alignment neighbor node of the node. The pre-training strategy may guide the representation obtaining model to learn text representations from semantic associations embedded in alignment relations. In another pre-training strategy, the representation obtaining model may be pre-trained through masking one or more node pairs having alignment edges in a source language node set corresponding to a source language text sample and a target language node set corresponding to a target language text sample; and for each node, recovering the node with a representation of a dependency neighbor node of the node. The pre-training strategy may guide the representation obtaining model to learn the text representation from semantic associations embedded in dependency relations.

FIG. 1 is a schematic diagram 100 illustrating an exemplary source language text, an exemplary target language text and exemplary relations among them according to an embodiment of the present disclosure. A source language text 102 may be a text "We should protect the environment" is English, which may include a set of source language words, i.e., "we", "should", "protect", "the", and "environment". Herein, a word included in a source language text in a source language may be referred to as a source language word. A target language text 104 may be a text "Wir sollten die Umwelt schützen" in German, which may include a set of target language words, i.e., "wir", "sollten", "die", "Umwelt" and "schützen". Herein, a word included in a target language text in a target language may be referred to as a target language word. The source language text 102 may be obtained through translating the target language text 104. Alternatively, the target language text 104 may be obtained through translating the source language text 102.

According to an embodiment of the present disclosure, relations among a plurality of words in the source language text 102 and the target language text 104 may be identified.

Alignment relations between the source language words in the source language text 102 and the target language words in the target language text 104 may be identified. In an embodiment, if a source language word and a target language word have similar semantic meaning, there is an alignment relation between the source language word and the target language word. The alignment relation may be identified through a known alignment identification technology such as GIZA++. In the schematic diagram 100, the alignment relations between the source language words in the source language text 102 and the target language words in the target language text 104 are shown by solid lines. For example, there may be an alignment relation between the source language word "we" and the target language word "wir", there may be an alignment relation between the source language word "should" and the target language word "sollten", there may be an alignment relation between the source language word "protect" and the target language word "schützen", there may be an alignment relation between the source language word "the" and the target language word "die", and there may be an alignment relation between the source language word "environment" and the target language word "Umwelt".

In addition, dependency relations among a set of words in the same language text may be identified, such as the dependency relations among a set of source language words, the dependency relations among a set of target language words, etc. In an embodiment, a syntax tree corresponding to a text may be constructed based on a syntax structure of the text, and it may be determined that there is a dependency relation between two words based on an association between the two words in the syntax tree. The dependency relation may be identified through a known dependency identification technology such as Stanza. The schematic diagram 100 shows a syntax tree 106 corresponding to the source language text 102, and a syntax tree 108 corresponding to the target language text 104. In the syntax trees 106 and 108, the dependency relations among the source language words in the source language text 102 and the dependency relations among the target language words in the target language text 104 are shown by dotted lines, respectively. For example, there may be dependency relations between the source language word "protect" and the source language words "we", "should" and "environment", there may be a dependency relation between the source language word "environment" and the source language word "the"; and there may be dependency relations between the target language word "schützen" and the target language words "Umwelt", "sollten" and "wir", there may be a dependency relation between the target language word "Umwelt" and the target language word "die".

It should be appreciated that the criteria and methods for identifying the relations among the plurality of words in the source language text and the target language text described above in conjunction with FIG. 1 are only exemplary. According to actual application requirements, the relations among the words may also be identified through other criteria or methods.

Figures 2, 3:
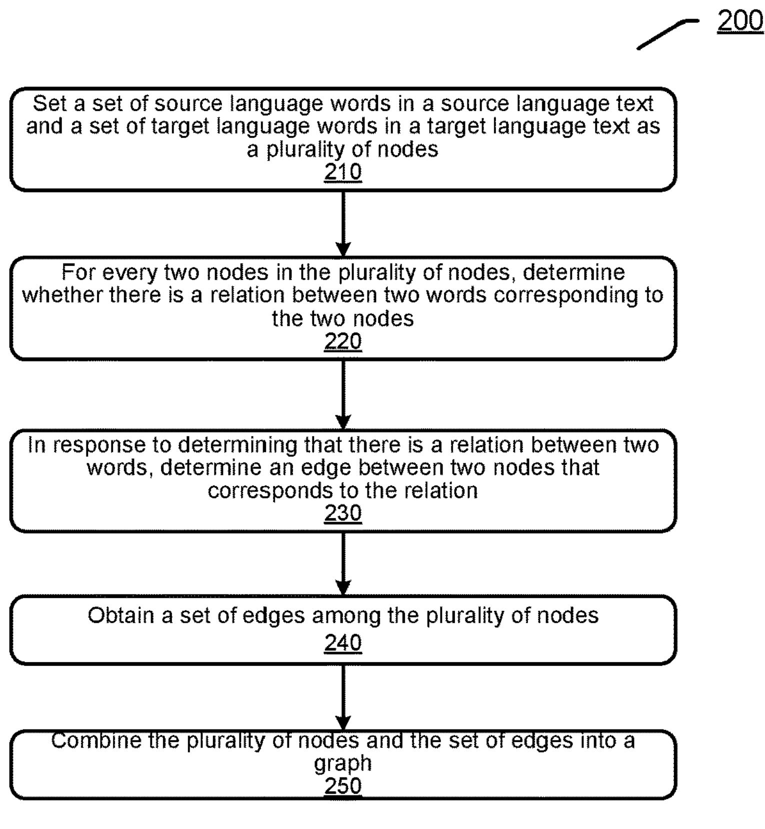
FIG. 2 illustrates an exemplary process for constructing a graph corresponding to a source language text and a target language text according to an embodiment of the present disclosure.
FIG. 3 illustrates an exemplary graph according to an embodiment of the present disclosure.

According to an embodiment of the present disclosure, a plurality of words in a source language text and a target language text and relations among the plurality of words may be explicitly modeled though constructing a graph corresponding to the source language text and the target language text, thereby semantic associations among these words may be better captured. FIG. 2 illustrates an exemplary process 200 for constructing a graph corresponding to a source language text and a target language text according to an embodiment of the present disclosure.

At 210, a set of source language words in a source language text and a set of target language words in a target language text may be set as a plurality of nodes.

At 220, for every two nodes in the plurality of nodes, it may be determined whether there is a relation between two words corresponding to the two nodes. As described above in conjunction with FIG. 1, the relations may include an alignment relation between a source language words in the set of source language words and a target language word in the set of target language words. If the source language word and the target language word have similar semantic meaning, there is a relation between the source language word and the target language word, and the relation is the alignment relation. In addition, the relations may further include dependency relations among the set of source language words and dependency relations among the set of target language words. A syntax tree corresponding to a text may be constructed based on a syntax structure of the text, and it may be determined that there is a relation between two words based on association between the two words in the syntax tree, and that the relation is a dependency relation.

At 230, in response to determining that there is a relation between two words, an edge between two nodes corresponding to the two words that corresponds to the relation may be determined. For example, when there is an alignment relation between two words, it may be determined that there is an alignment edge between two nodes corresponding to the two words. In addition, when there is a dependency relation between two words, it may be determined that there is a dependency edge between two nodes corresponding to the two words.

The steps 220 and 230 may be performed for every two nodes in the plurality of nodes corresponding to the set of source language words in the source language text and the set of target language words in the target language text. At 240, a set of edges among the plurality of nodes may be obtained. Therefore, through the exemplary process from the step 220 to the step 240 in the process 200, the set of edges among the plurality of nodes may be determined based on the relations among the plurality of words in the source language text and the target language text.

At 250, the plurality of nodes and the obtained set of edges may be combined into a graph corresponding to the source language text and the target language text. As described above, since the graph corresponding to the source language text and the target language text constructed according to the embodiments of the present disclosure integrates the dependency relations related to the syntax structure and the alignment relations, the graph may also be referred to as a Syntax-Enhanced and Alignment-Aware graph, abbreviated as a SA graph.

It should be appreciated that the process 200 in FIG. 2 is only an example of a process for constructing an SA graph corresponding to a source language text and a target language text based on relations among a plurality of words in the source language text and the target language text. According to actual application requirements, the process for constructing a SA graph may comprise any other steps, and may comprise more or fewer steps.

FIG. 3 illustrates an exemplary SA graph 300 according to an embodiment of the present disclosure. The SA graph 300 may be, e.g., a SA graph constructed through the process 200 in FIG. 2 and corresponding to the source language text 102 and the target language text 104 in FIG. 1.

The nodes 302 to 310 may respectively correspond to the source language words "protect", "we", "should", "environment" and "the" in the source language text 102. Herein, a node corresponding to a source language word in a source language text may be referred to as a source language node. That is, the nodes 302 to 310 may be referred to as source language nodes. The node 312 to the node 320 may respectively correspond to the target language words "wir", "sollten", "Umwelt", "die", and "schützen" in the target language text 104. Herein, a node corresponding to a target language word in a target language text may be referred to as a target language node. That is, the node 312 to the node 320 may be referred to as target language nodes.

In the graph 300, an alignment edge between each source language node in the source language nodes 302 to 310 and a corresponding target language node in the target language nodes 312 to 320 is shown by solid lines. For example, there may be an alignment edge between the source language node 302 and the target language node 320, there may be an alignment edge between the source language node 304 and the target language node 312, there may be an alignment edge between the source language node 306 and the target language node 314, there may be an alignment edge between the source language node 308 and the target language node 316, and there may be an alignment edge between the source language node 310 and the target language node 318.

In addition, in the graph 300, dependency edges among the source language nodes 302 to 310 and dependency edges among the target language nodes 312 to 320 are shown by dotted lines. For example, there may be dependency edges between the source language node 302 and the source language nodes 304 to 308, and there may be a dependency edge between the source language node 308 and the source language node 310; and there may be dependency edges between the target language node 320 and the target language nodes 312 to 316, and there may be a dependency edge between the target language node 316 and the target language node 318.

Each node may have one or more neighbor nodes. Herein, a node having an edge with a current node may be referred to as a neighbor node of the current node. As described above, edges may include an alignment edge and a dependency edge. Accordingly, a node having an alignment edge with a current node may be an alignment neighbor node of the current node, and a node having a dependency edge with a current node may be a dependency neighbor node of the current node. For example, the node 302 may be an alignment neighbor node of the node 320, and the node 314 may be a dependency neighbor node of the node 320.

It should be appreciated that the SA graph 300 shown in FIG. 3 is only an example of a constructed SA graph corresponding to a source language text and a target language text. According to actual application requirements, a SA graph corresponding to a source language text and a target language text may have any other structure and may include other elements.

Figure 4:
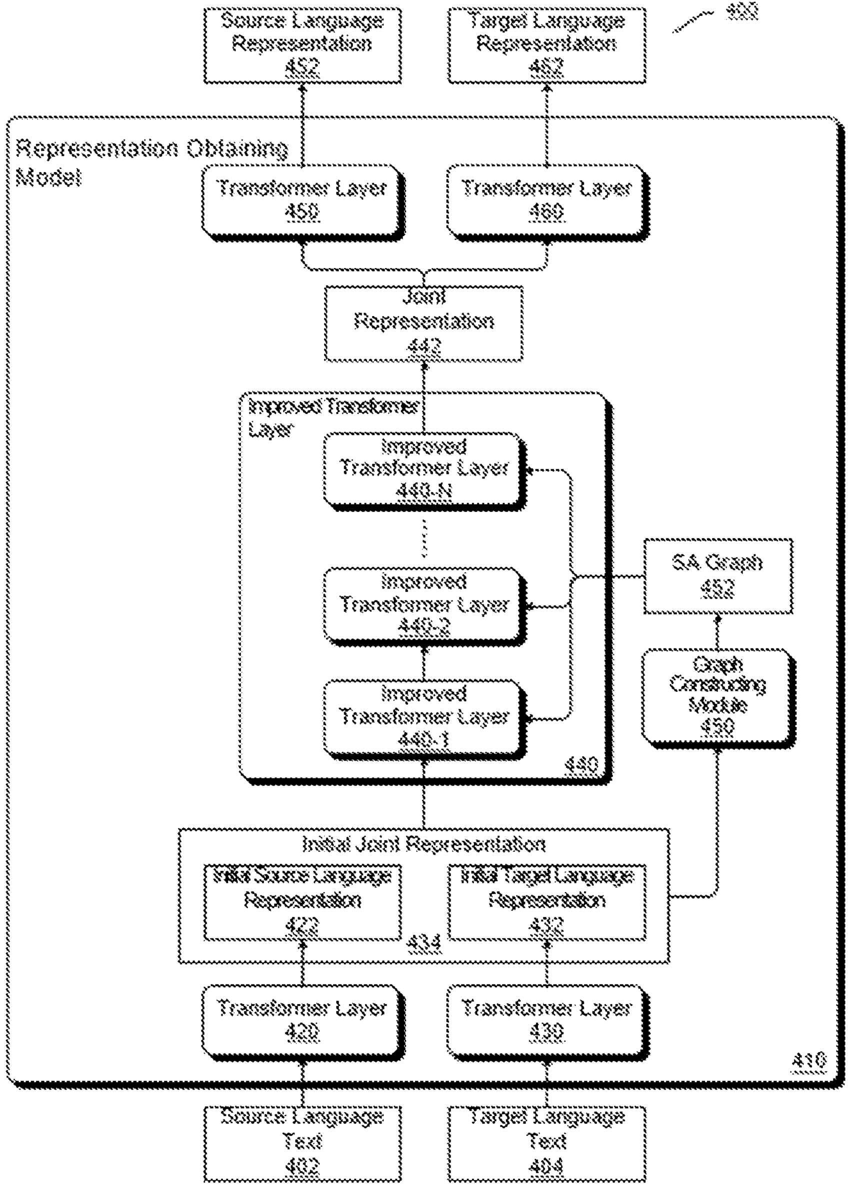
FIG. 4 illustrates an exemplary process for representation learning of cross-language texts according to an embodiment of the present disclosure.

FIG. 4 illustrates an exemplary process 400 for representation learning of cross-language texts according to an embodiment of the present disclosure. For example, a source language representation 452 of a source language text 402 and a target language representation 462 of a target language text 404 may be obtained through a representation obtaining model 410. Herein, a representation corresponding to a source language text obtained through a representation obtaining model may be referred to as a source language representation, and a representation corresponding to a target language text obtained though a representation obtaining model may be referred to as a target language representation.

Firstly, the source language text 402 S and the target language text 404 T may be obtained. The target language text T may be given, and then the source language text S may be obtained through translating the target language text T. Alternatively, the source language text S be given, and then the target language text T may be obtained through through translating the source language text S. The source language text S and the target language text T may include tokens of different lengths. A length of the source language text S and a length of the target language text T may be unified as l though operations such as padding or truncation. The source language text S ($S \in \mathbb{R}^{l \times d}$) and the target language text T ($T \in \mathbb{R}^{l \times d}$) with a uniform length may be input in parallel into the representation obtaining model 410, where d is a dimension of a token embedding vector.

The source language text S may be input into a transformer layer 420 in the representation obtaining model 410. The transformer layer 420 may generate an initial source language representation $$422\ A_0^s$$

of the source language text S. The target language text T may be input into a transformer layer 430 in the representation obtaining model 410. The transformer layer 430 may generate an initial target language representation 432

$$A_0^t$$

of the target language text T. The above processing may be expressed by the following formulas:

$$A_0^s = \text{Transformer}(S) \tag{1}$$

$$A_0^t = \text{Transformer}(T) \tag{2}$$

The initial source language representation $$A_0^s$$

and the initial target language representation $$A_0^t$$

may be combined, e.g., cascaded, to an initial joint representation 434

$$[A_0^s; A_0^t]([A_0^s; A_0^t] \in \mathbb{R}^{2l \times d}).$$

The initial joint representation $$[A_0^s; A_0^t]$$

may be provided to a set of improved transformer layers 440. The set of improved transformer layers 440 may generate a joint representation 442 $[A^s; A^t]$ of the source language text S and the target language text T based on the initial joint representation $$[A_0^s; A_0^t]$$

and relations among a plurality of words in the source language text S and the target language text T. In an implementation, a SA graph 452 corresponding to the source language text S and the target language text T may be constructed based on the relations among a plurality of words in the source language text S and the target language text T though a graph construction module 450. The graph constructing module 450 may construct the SA graph 452 through e.g., the process 200 in FIG. 2. Further, the set of improved transformer layers 440 may update the initial joint representation $$[A_0^s; A_0^t]$$

to a joint representation $[A^s; A^t]$ based on the graph 452.

The update operation may be performed iteratively through the set of improved transformer layers 440, to update the initial joint representation $$[A_0^s; A_0^t]$$

to the joint representation $[A^s; A^t]$. The set of improved transformer layers 440 may include, e.g., N improved transformer layers 440-1, 440-2, . . . , 440-N having a same model structure. An improved converter layer 440-*n* ($n \in [1, N]$) may update a previous joint representation $$\left[A_{n-1}^s; A_{n-1}^t\right]$$

output by a previous improved transformer layer 440-*n*−1 to a current joint representation $$\left[A_n^s; A_n^t\right],$$

as shown in the following formula:

$$[A_n^s; A_n^t] = \text{Transformer}_{sa}([A_{n-1}^s; A_{n-1}^t]) \tag{3}$$

An exemplary process for updating a previous joint representation will be described later in conjunction with FIG. 5. After the joint representation $[A^s; A^t]$ is obtained, the joint representation $[A^s; A^t]$ may be projected to the source language representation 452 $A^s$ corresponding to the source language text S through a transformer layer 450. In addition, the joint representation $[A^s; A^t]$ may be projected to the target language representation 462 $A^t$ corresponding to the target language text T through a transformer layer 460.

The source language representation $A^s$ or the target language representation $A^t$ may be further used to perform various NLU tasks, such as a machine reading comprehension task, a classification task, a question answering task, etc. Taking the target language representation $A^t$ being used to perform the machine reading comprehension task as an example, the task may find an answer fragment for a specific question from a given passage. The target language representation $A^t$ may be provided to two separate linear layers. After being processed through each linear layer, a softmax operation may be performed respectively, to generate final prediction results of an answer segment, i.e., a start position prediction $$p_s^t \in \mathbb{R}^l$$

and an end position prediction $$p_e^t \in \mathbb{R}^l$$

for the answer segment, as shown in the following formulas:

$$p_s^t = softmax(A^t \cdot u_s + b_s) \quad (4)$$

$$p_e^t = softmax(A^t \cdot u_e + b_e) \quad (5)$$

wherein $u_s$ and $u_e \in \mathbb{R}^d$, as well as $b_s$ and $b_e \in \mathbb{R}^l$ are trainable model parameters. For example, when training for the machine reading comprehension task, the parameters $u_s$, $u_e$, $b_s$, and $b_e$ may be learned through minimizing a standard cross-entropy loss as shown in the following formula:

$$\mathcal{L}^t = -\frac{1}{\|\mathcal{D}\|}\sum_{i=1}^{\|\mathcal{D}\|}\left(\mathcal{Y}_{s,i}^t \cdot \log\left(p_{s,i}^t\right) + \mathcal{Y}_{e,i}^t \cdot \log\left(p_{e,i}^t\right)\right) \quad (6)$$

wherein $\|\mathcal{D}\|$ is the number of training samples, $\mathcal{Y}_{s,i}^t$ and $\mathcal{Y}_{e,i}^t \in \mathbb{R}^l$ are ground truth labels for the start position and the end position of the i-th training sample, respectively.

It should be appreciated that the process 400 in FIG. 4 is only an example of a process for representation learning of cross-language texts. According to actual application requirements, the process for representation learning of cross-language texts may comprise any other steps, and may comprise more or fewer steps. In addition, it should be appreciated that although in the above description, the source language representation or the target language representation is used to perform the machine reading comprehension task, the source language representation or the target language representation generated according to the embodiments of the present disclosure may also be used to perform various other NLU tasks, such as a classification task, a question answering task, etc.

Figure 5:
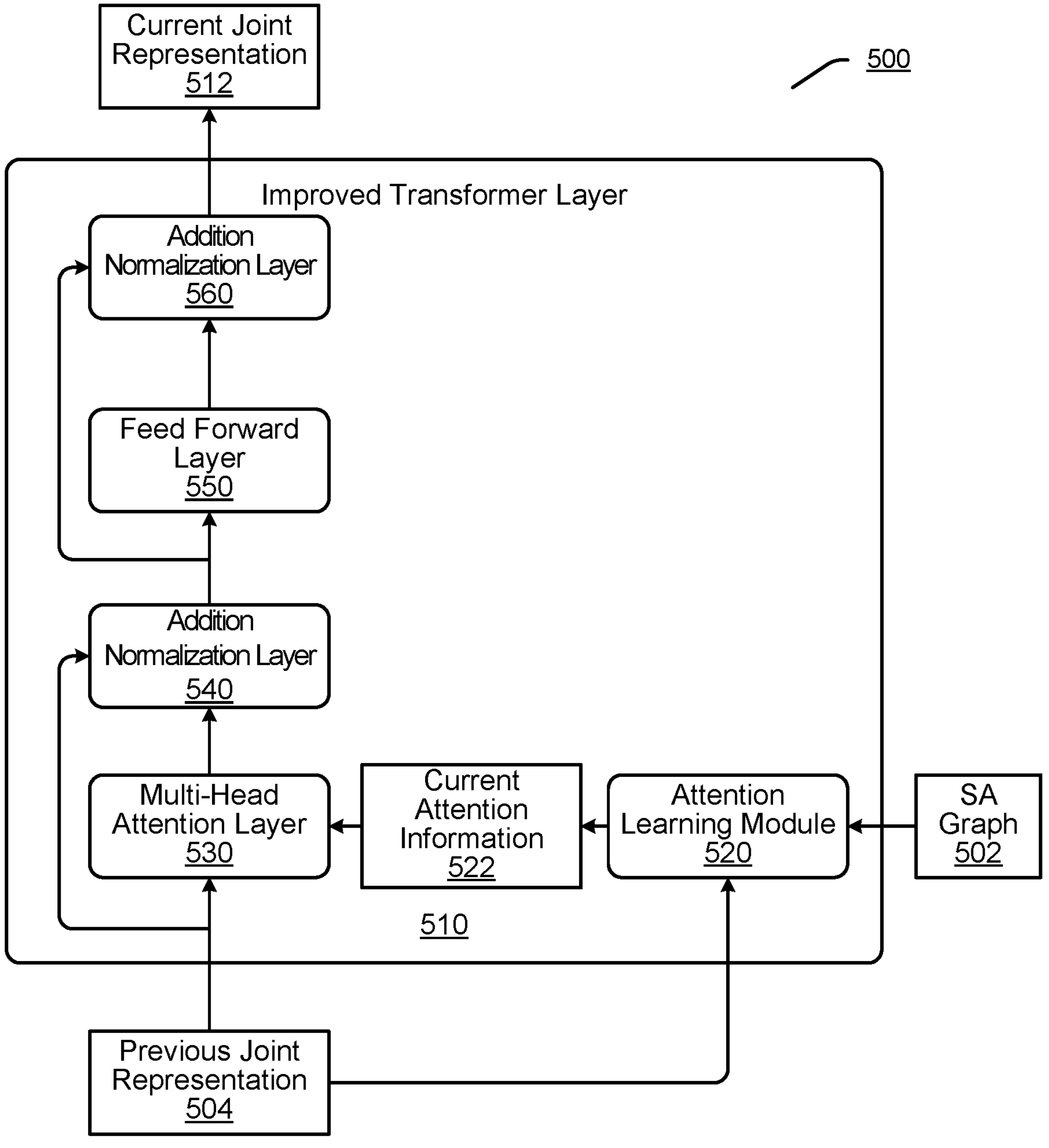
FIG. 5 illustrates an exemplary process for updating a previous joint representation according to an embodiment of the present disclosure.

FIG. 5 illustrates an exemplary process 500 for updating a previous joint representation according to an embodiment of the present disclosure. For example, a previous joint representation 504 corresponding to a source language text and a target language text may be updated to a current joint representation 512 corresponding to the source language text and the target language text through an improved transformer layer 510. The improved transformer layer 510 may, e.g., correspond to any transformer layer 440-*n* in the improved transformer layers 440-1, 440-2, . . . , 440-N in FIG. 4. For example, current attention information 522 corresponding to the source language text and the target language text may be obtained based on a SA graph 502 and a previous joint representation 504 corresponding to the source language text and the target language text, and the previous joint representation 504 may be updated to the current joint representation 512 corresponding to the source language text and the target language text based on the current attention information 522.

The improved transformer layer 510 may include an attention learning module 520. The attention learning module 520 may obtain current attention information 522 based on the SA graph 502 and the previous joint representation 504. The current attention information 522 may be, e.g., an attention matrix $G \in \mathbb{R}^{2l \times 2l}$, and an element $G_{i,j}$ therein may be an attention score indicating an attention applied by a word i to a word j. An exemplary process for obtaining current attention information will be described later in conjunction with FIG. 6. The attention score $G_{i,j}$ may include information about an alignment relation and/or a dependency relation between the word i and the word j.

The current attention information 522 G may be provided to a multi-head attention layer 530. The multi-head attention layer 530 may firstly obtain a triplet for each head through applying a linear transformation to the previous joint representation 504. Taking the m-th head $head_m$ as an example, the multi-head attention layer 530 may firstly obtain a triplet for the $head_m$ through applying linear transformation $$W_m^q, W_m^k$$

and $$W_m^v(W_m^q, W_m^k \text{ and } W_m^v \in \mathbb{R}^{d \times d_h})$$

to the previous joint representation 504, i.e., query $Q_m$, key $K_m$ and value $V_m$ ($Q_m$, $K_m$ and $V_m \in \mathbb{R}^{2l \times d_h}$), wherein $d_h$ is a dimension of $head_m$, and $$W_m^q, W_m^k \text{ and } W_m^v$$

are trainable model parameters. Then, the $head_m$ may perform an attention operation, as shown in the following formula:

$$\text{head}_m = \text{softmax}\left(\frac{Q_m K_m^T}{\sqrt{d_k}} + G\right)V_m \quad (7)$$

The output of each head may be cascaded. Subsequently, after being processed by an addition normalization layer 540, a feed forward layer 550, and an addition normalization layer 560, the current joint representation 512 may be obtained.

It should be appreciated that the process 500 in FIG. 5 is only an example of a process for updating a previous joint representation. According to the actual application requirements, the process for updating a previous joint representation may comprise any other steps, and may comprise more or fewer steps. In addition, the specific order or hierarchy of the steps in the process 500 is only exemplary, and the process for updating a previous joint representation may be performed in an order different from the described one.

Figure 6:
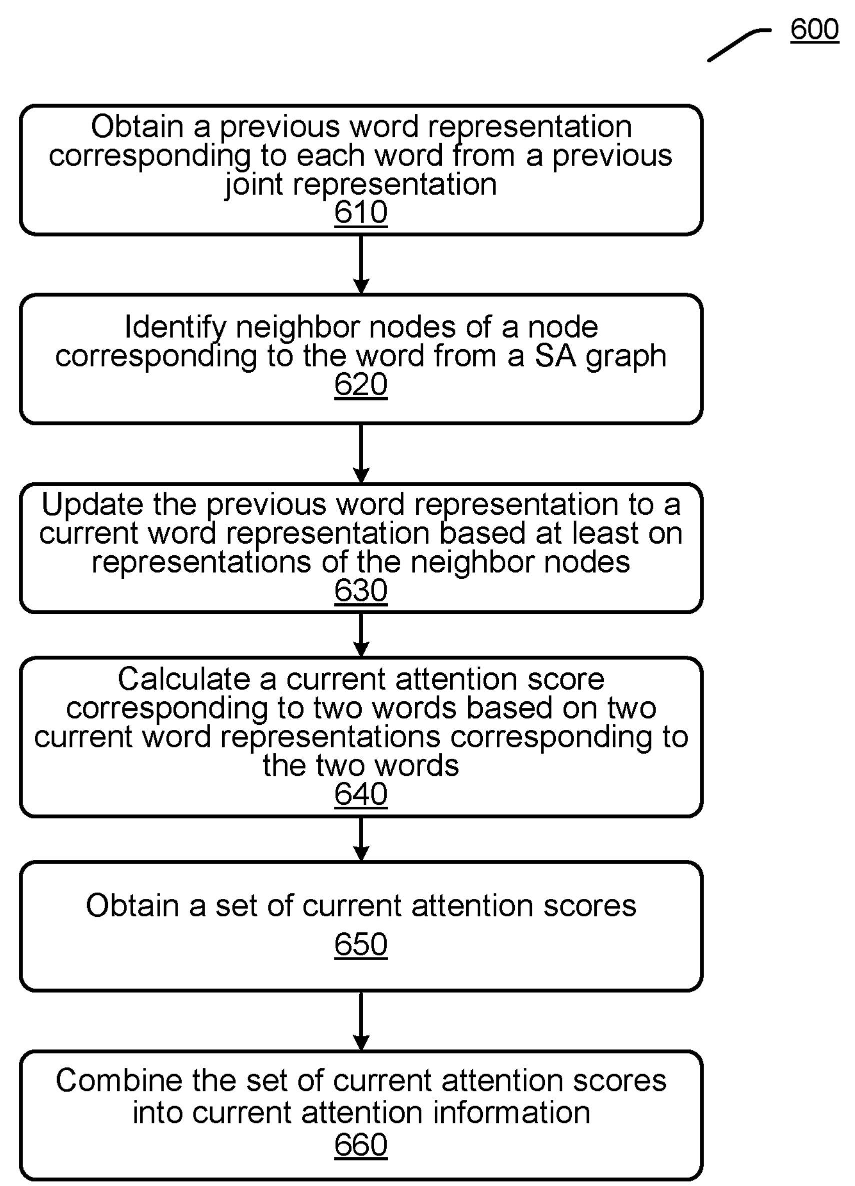
FIG. 6 illustrates an exemplary process for obtaining current attention information according to an embodiment of the present disclosure.

FIG. 6 illustrates an exemplary process 600 for obtaining current attention information according to an embodiment of the present disclosure. The process 600 may be performed by, e.g., the attention learning module 520 in FIG. 5. In the process 600, current attention information corresponding to a source language text and a target language text may be obtained based on a SA graph corresponding to the source language text and the target language text and a previous joint representation of the source language text and the target language text.

At 610, a previous word representation corresponding to each word may be obtained from a previous joint representation. A previous word representation corresponding to a word i may be denoted as $h_i$.

Subsequently, a current word representation of each word may be obtained based at least on a SA graph. At 620, one or more neighbor nodes of a node corresponding to the word may be identified from the SA graph. One or more neighbor nodes of a node i corresponding to the word i may be denoted as $\mathcal{N}(i)$. As described above, neighbor nodes $\mathcal{N}(i)$ may include, e.g., an alignment neighbor node, a dependency neighbor node, etc. The alignment neighbor node of the node i may be denoted as $\mathcal{N}_a(i)$, and the dependency neighbor node of the node i may be denoted as $\mathcal{N}_s(i)$.

At 630, the previous word representation may be updated to a current word representation based at least on one or more representations of the one or more neighbor nodes. Continuing to take the word i as an example, the previous word representation $h_i$ may be updated to a current word representation $f_i$ based at least on representations of the neighbor nodes $\mathcal{N}(i)$, as shown in the following formula:

$$f_i = \mathcal{F}(h_i, \mathcal{N}(i)) \tag{8}$$

wherein $\mathcal{F}_a(\cdot,\cdot)$ is a function that uses the representations of the neighbor nodes $\mathcal{N}(i)$ to update the representation $h_i$ of the node i.

The neighbor nodes $\mathcal{N}(i)$ may include, e.g., one or more alignment neighbor nodes $\mathcal{N}_a(i)$. The previous word representation $h_i$ may be updated, based at least on one or more representations of one or more alignment neighbor nodes $\mathcal{N}_a(i)$, to a current word representation $$f_i^a$$

which based on alignment relations, as shown in the following formula:

$$f_i^a = \mathcal{F}_a(h_i, \mathcal{N}_a(i)) \tag{9}$$

wherein $\mathcal{F}_a(\cdot,\cdot)$ is a function that uses representations of the alignment neighbor nodes $\mathcal{N}_a(i)$ to update the representation $h_i$ of the node i.

The alignment neighbor nodes $\mathcal{N}_a(i)$ are identified based on alignment relations between the words corresponding to the nodes. Word alignment is a challenging task. The existing alignment methods may have alignment errors. An embodiment of the present disclosure proposes to update the previous word representation $h_i$ based on a semantic difference between an alignment neighbor node $\mathcal{N}_a(i)$ and the node i. For example, the impact of alignment errors for updating the current word representation $$f_i^a$$

may be alleviated through a gating mechanism. In the gating mechanism, when a semantic difference between an alignment neighbor node $\mathcal{N}_a(i)$ and the node i is large, e.g., when there is an alignment error, a weight of a representation of the alignment node $\mathcal{N}_a(i)$ may be reduced when the representation of the node i is being updated, thereby, the impact caused by the alignment error may be alleviated. When there are a plurality of alignment neighbor nodes, the plurality of alignment neighbor nodes may be taken as a whole to determine the semantic difference with the node i.

A gating coefficient $g_i \in \mathbb{R}^d$ reflecting a semantic difference between an alignment neighbor node $\mathcal{N}_a(i)$ and a node i may be adopted to control a weight of a representation of the alignment neighbor node $\mathcal{N}_a(i)$ in updating the representation of a word i. The gating coefficient $g_i$ may be obtained, e.g., through the following formula:

$$g_i = \sigma(V_1 \cdot h_i + W_1 \cdot \bar{h}_j) \tag{10}$$

where $\bar{h}_j = \text{avg}\{h_j | h_j \in \mathcal{N}_a(i)\}$ is an average value of the representations of the alignment neighbor nodes $\mathcal{N}_a(i)$, and σ is a sigmoid function. When there is an alignment neighbor node, $\bar{h}_j$ may be a representation of the alignment neighbor node. Subsequently, the current word representation $$f_i^a$$

of the word i may be generated based on $\bar{h}_j$ and the gating coefficient $g_i$, as shown in the following formula:

$$f_i^a = (1 - g_i) \odot (V_2 \cdot h_i) + g_i \odot (W_2 \cdot \bar{h}_j) \tag{11}$$

wherein ⊙ may represent an element-wise multiplication operation. When the semantic difference between the alignment neighbor node $\mathcal{N}_a(i)$ and the node i is large, the gating coefficient $g_i$ will be small or even close to zero, so that the weight of the representation of the alignment neighbor node $\mathcal{N}_a(i)$ in updating the representation of the word i may be reduced to alleviate the impact caused by alignment error.

The neighbor nodes $\mathcal{N}(i)$ may also include, e.g., one or more dependency neighbor nodes $\mathcal{N}_s(i)$. The previous word representation $h_i$ may be updated, based on one or more representations of one or more dependency neighbor nodes $\mathcal{N}_s(i)$, to a current word representation $$f_i^s$$

which is based on dependency relations, as shown in the following formula:

$$f_i^s = \mathcal{F}_s(h_i, \mathcal{N}_s(i)) \tag{12}$$

wherein $\mathcal{F}_s(\cdot,\cdot)$ is a function that uses representations of the dependency neighbor node $\mathcal{N}_s(i)$ to update the representation $h_i$ of the node i.

According to an embodiment of the present disclosure, the representation of the node i may be updated based on an importance of a dependency neighbor node $\mathcal{N}_s(i)$ relative to the node i. When there are a plurality of dependency neighbor nodes, the representation of the node i may be updated based on an importance of each dependency neighbor node relative to the node i. For example, if a dependency neighbor node is important relative to the node i, when the representation of the node i is being updated, a greater weight corresponding to the representation of the dependency neighbor node may be given, so that more consideration may be given to the representation of the dependency neighbor node when the representation of the node i is being updated. An importance $\alpha_{iu}$ of a dependency neighbor node $u \in \mathcal{N}_s(i)$ in the dependency neighbor nodes $\mathcal{N}_s(i)$ relative to the node i may be calculated, e.g., through the following formula:

$$\alpha_{iu} = \frac{\exp(LR(W_4[h_i; h_u]))}{\sum_{k \in \mathcal{N}_S(i)} \exp(LR(W_4[h_i; h_k]))} \tag{13}$$

wherein LR may be the Leaky ReLU activation function, and $W_4 \in \mathbb{R}^{2d}$ is a trainable model parameter.

Subsequently, a current word representation $$f_i^s$$

based on the dependency relation of the word i may be generated based on one or more representations of one or more dependency neighbor nodes $\mathcal{N}_a(i)$ and an importance $\alpha_{iu}$ corresponding to each dependency neighbor node, as shown in the following formula:

$$f_i^s = \sigma\left(\sum\left(\alpha_{iu} W_3\ h_u, \forall u \in \mathcal{N}_s(i)\right)\right) \tag{14}$$

After obtaining the current word representation $$f_i^a$$

based on the alignment relations and the current word representation $$f_i^s,$$

based on the dependency relations of the word i, the current word representation $f_i$ of the word i may be generated based on the two current word representations. In an implementation, the current word representation $f_i$ may be calculated as an average value of a sum of the current word representation $$f_i^a$$

and the current word representation $$f_i^s,$$

as shown in the following formula:

$$f_i = \frac{1}{2}(f_i^a + f_i^s) \tag{15}$$

At 640, a current attention score corresponding to two words may be calculated based on two current word representations corresponding to the two words. For example, a current attention score $G_{i,j}$ corresponding to the word i and the word j may be calculated based on a current word representation $f_i$ corresponding to the word i and a current word representation $f_j$ corresponding to the word j, as shown in the following formula:

$$G_{i,j} = (W_{att} \cdot f_i + b_{att}) \cdot (W_{att} \cdot f_j + b_{att}) \tag{16}$$

wherein $W_{att} \in \mathbb{R}^{d \times d}$ and $b_{att} \in \mathbb{R}^d$ are trainable model parameters.

The steps 610-640 may be performed for every two words in a set of source language words in the source language text and a set of target language words in the target language text. At 650, a set of current attention scores may be obtained, and each current attention score corresponds to two words in the set of source language words and the set of target language words.

At 660, the set of current attention scores may be combined into current attention information, i.e., an attention matrix G.

It should be appreciated that the process 600 in FIG. 6 is only an example of a process for obtaining current attention information. According to the actual application requirements, the process for obtaining current attention information may comprise any other steps, and may comprise more or fewer steps. For example, the current word representation $f_i$ of the word i may be calculated through performing other combination operations on the current word representation $$f_i^a$$

and the current word representation $$f_i^s$$

of the word i, e.g., a weighted sum operation, a maximum pooling operation, etc. In addition, the specific order or hierarchy of the steps in the process 600 is only exemplary, and the process for obtaining current attention information may be performed in an order different from the described one.

The exemplary process for obtaining the source language representation of the source language text and the target language representation of the target language text according to the embodiments of the present disclosure is described above in conjunction with FIGS. 4 to 6. After the initial joint representation of the source language text and the target language text is obtained, the initial joint representation may be updated to the joint representation though iteratively performing the update operation. The update operation may comprise e.g., obtaining the current attention information based on the SA graph corresponding to the source language text and the target language text and the previous joint representation; and updating the previous joint representation to the current joint representation based on the current attention information. When calculating the current attention information, the alignment relations between the words in the source language text and the words in the target language text are considered. Two words that have an alignment relation may usually have similar semantic meaning. Considering the alignment relations when generating the joint representation of the source language text and the target language text may facilitate to understand semantics of each word in the source language text and the target language text. In addition, the relations among a plurality of words in the source language text and the target language text may include dependency relations related to a syntax structure of each text, e.g., dependency relations among a plurality of words in the source language text and dependency relations among a plurality of words in the target language text. Correct alignment relations between the source language text and the target language text may be found with the aid of the dependency relations. Considering the alignment relations and the dependency relations when generating the representation of the source language text and the target language text may enhance the knowledge transfer between the source language text and the target language text, to generate a more accurate joint representation of the source language text and the target language text. The joint representation may be projected to the source language representation corresponding to the source language text and/or the target language representation corresponding to the target language text. When performing a task with the source language representation and/or target language representation, a more accurate representation may facilitate to obtain a more accurate result.

Figure 7:
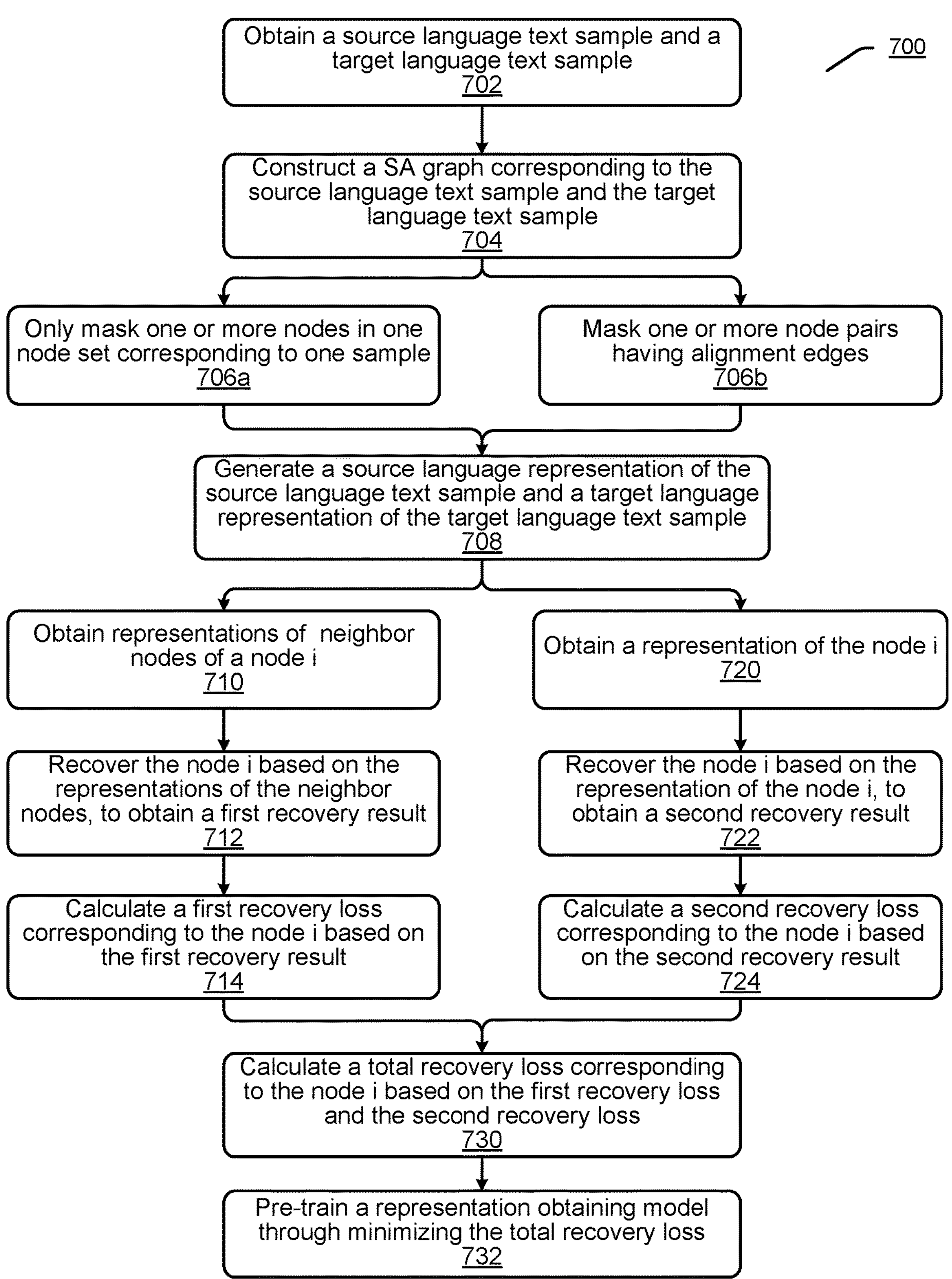
FIG. 7 illustrates an exemplary process for pre-training a representation obtaining model according to an embodiment of the present disclosure.

According to an embodiment of the present disclosure, in order to enhance the ability of a representation obtaining model, such as the representation obtaining model 410 in FIG. 4, to generate representations, the representation obtaining model may be pre-trained with a training dataset. The training dataset may include one or more sample pairs, and each sample pair may include a source language text sample and a corresponding target language text sample. FIG. 7 illustrates an exemplary process 700 for pre-training a representation obtaining model according to an embodiment of the present disclosure. The representation obtaining model may be, e.g., the representation obtaining model 410 in FIG. 4.

At 702, a source language text sample and a target language text sample may be obtained. In an embodiment, the target language text sample may be obtained firstly, and then the source language text sample may be obtained through translating the target language text sample. Alternatively, the source language text sample be obtained firstly, and then the target language text sample may be obtained through translating the source language text sample.

At 704, a SA graph corresponding to the source language text sample and the target language text sample may be constructed. The SA graph corresponding to the source language text sample and the target language text sample may be constructed through, e.g., the process 200 of FIG. 2. The constructed SA graph may include a source language node set corresponding to the source language text sample and a target language node set corresponding to the target language text sample.

After the SA graph is constructed, according to the embodiments of the present disclosure, one or more nodes in the source language node set and/or the target language node set may be masked.

At 706*a*, only one or more nodes in one node set corresponding to one sample may be masked. For example, one or more source language nodes in the source language node set may be masked without masking any target language node in the target language node set, or one or more target language nodes in the target language node set may be masked without masking any source language node in the source language node set. This masking strategy may also be referred to as a single language masking strategy.

Figure 8:
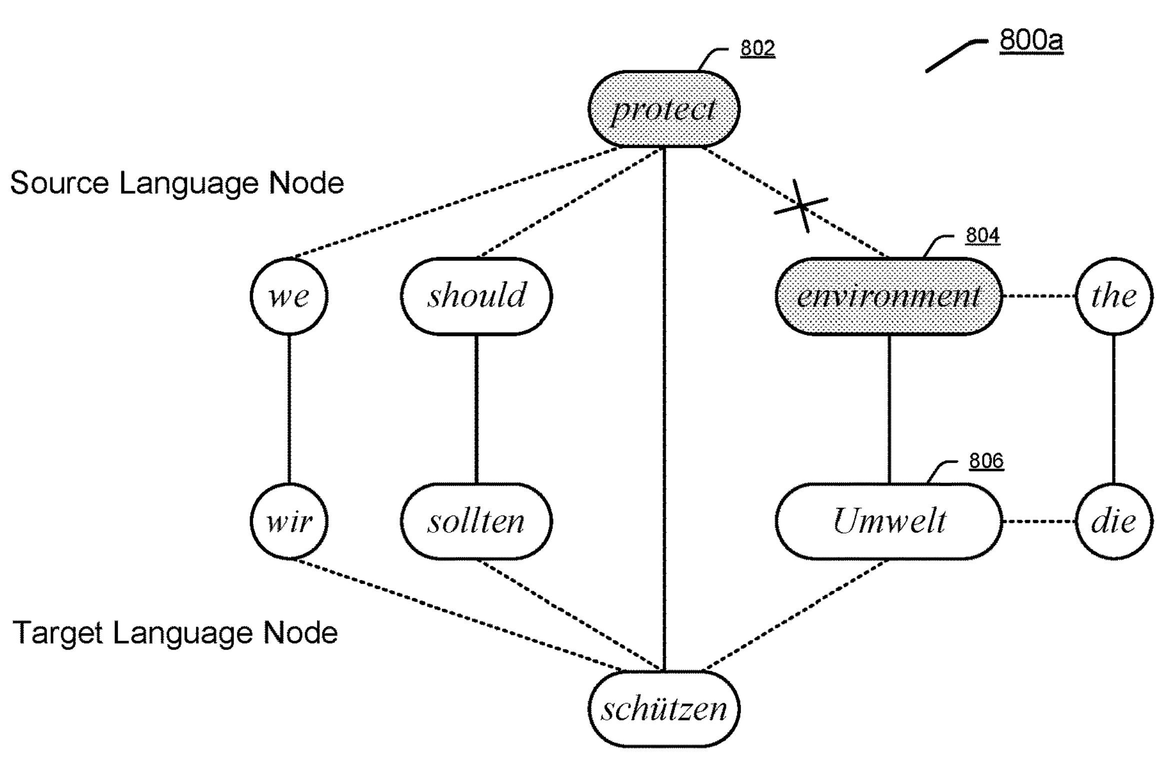
FIG. 8 illustrates exemplary graphs adopting masking strategies according to embodiments of the present disclosure.
Figure 8:
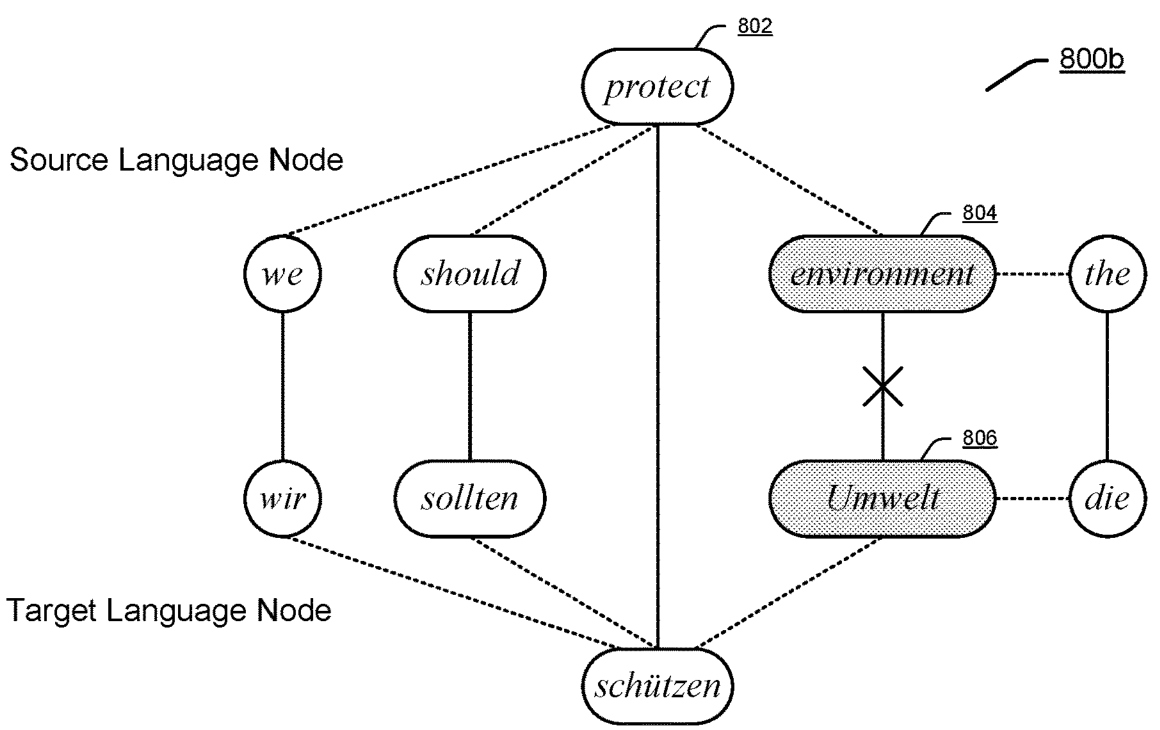

FIG. 8 illustrates exemplary SA graphs 800*a* and 800*b* adopting masking strategies according to embodiments of the present disclosure. The SA graphs 800*a* and 800*b* may correspond to the SA graph 300 in FIG. 3. Gray nodes in the SA graphs 800*a* and 800*b* may be masked nodes. The SA graph 800*a* may adopt e.g., the single language masking strategy. For example, a node 802 and a node 804 may be masked. The two nodes are in the same node set. In addition, for the node 804, since the node 802 is also masked, a dependency edge between the two nodes is cut off.

Alternatively, at 706*b*, one or more node pairs having alignment edges in the source language node set and the target language node set may be masked. For example, one or more source language nodes and one or more target language nodes having alignment edges with the one or more source language nodes may be masked. In other words, whenever a node is masked, a node aligned with it should also be masked. This masking strategy may also be referred to as a cross-language masking strategy. The SA graph 800*b* in FIG. 8 may adopt, e.g., the cross-language masking strategy. For example, the node 804 and a node 806 may be masked. The two nodes are in different node sets, and there is an alignment edge between the two nodes. In addition, for the node 804, since the node 806 is also masked, an alignment edge between the two nodes is cut off.

In the pre-training phase, the masking operation at 706*a* that adopts the single-language masking strategy may be performed in one part of the phase, and the masking operation at 706*b* that adopts the cross-language masking strategy may be performed in another part of the phase. For example, for a plurality of sample pairs included in the training dataset, the operation at 706*a* may be performed for a part of the sample pairs, and the operation at 706*b* may be performed for another part of the sample pairs.

After the masking operation at 706*a* or the masking operation at 706*b* is performed, at 708, a source language representation of the source language text sample and a target language representation of the target language text sample may be generated. The source language representation and the target language representation may be generated, e.g., through the representation obtaining model 410 in FIG. 4.

After the source language representation and the target language representation are generated, each masked node may be recovered based on representations of neighbor nodes of the masked node and a representation of the masked node, recovery losses corresponding to the masked node may be calculated based on recovery results, and the representation obtaining module may be pre-trained through minimizing the recovery losses. The above process will be described through taking a node i, which is one of masked nodes, as an example.

At 710, representations of one or more neighbor nodes $\mathcal{N}(i)$ of the node i may be obtained. In the case where the masking operation at 706*a* is performed, the neighbor nodes $\mathcal{N}(i)$ may include only alignment neighbor nodes (i), or include alignment neighbor nodes $\mathcal{N}_a(i)$ and dependency neighbor nodes $\mathcal{N}_s(i)$ of the node i. In the case where the masking operation at 706*b* is performed, the neighbor nodes $\mathcal{N}(i)$ may only include dependency neighbor nodes $\mathcal{N}_s(i)$ of the node i. A representation corresponding to each neighbor node in the neighbor nodes $\mathcal{N}(i)$ may be obtained from a joint representation of the source language text sample and the target language text sample.

At 712, the node i may be recovered based on one or more representations of the one or more neighbor nodes $\mathcal{N}(i)$, to obtain a first recovery result. For example, the one or more representations of the one or more neighbor nodes $\mathcal{N}(i)$ may be input into a linear classifier. The linear classifier may output a probability predicted based on the representation for each word in an entire vocabulary, wherein the predicted probability for a word i corresponding to the node i may be denoted as $P(i|\mathcal{N}(i))$.

At 714, a first recovery loss $\mathcal{L}_{SA}(i)$ corresponding to the node i may be calculated based on the first recovery result. In an implementation, the first recovery loss $\mathcal{L}_{SA}(i)$ may be calculated through a cross-entropy function, as shown in the following formula:

$$\mathcal{L}_{SA}(i) = -\log P(i|\mathcal{N}(i)) \quad (17)$$

The node i may be recovered through the representation of the node i. At 720, a representation $h_i$ of the node i may be obtained. The representation $h_i$ corresponding to the node i may be obtained from a joint representation of the source language text sample and the target language text sample.

At 722, the node i is recovered based on the representation $h_i$ of the node i, to obtain a second recovery result. For example, the representation of the node i may be input into a linear classifier. The linear classifier may output a probability based on the representation for each word in an entire vocabulary predicted, wherein the predicted probability for a word i corresponding to the node i may be denoted as $P(i|h_i)$.

At 724, a second recovery loss $\mathcal{L}_{TLM}(i)$ corresponding to the node i may be calculated based on the second recovery result. In an implementation, the second recovery loss $\mathcal{L}_{TLM}(i)$ may be calculated through a cross-entropy function, as shown in the following formula:

$$\mathcal{L}_{TLM}(i) = -\log P(i|h_i) \quad (18)$$

After obtaining the first recovery loss $\mathcal{L}_{SA}(i)$ and the second recovery loss $\mathcal{L}_{TLM}(i)$ corresponding to the node i, at 730, a total recovery loss $\mathcal{L}(i)$ may be calculated based on the first recovery loss $\mathcal{L}_{SA}(i)$ and the second recovery loss $\mathcal{L}_{TLM}(i)$. In an implementation, the total recovery loss $\mathcal{L}(i)$ may be calculated as a sum of the first recovery loss $\mathcal{L}_{SA}(i)$ and the second recovery loss $\mathcal{L}_{TLM}(i)$, as shown in the following formula:

$$\mathcal{L}(i) = \mathcal{L}_{SA}(i) + \mathcal{L}_{TLM}(i) \quad (19)$$

At 732, a representation obtaining model may be pre-trained through minimizing the total recovery loss $\mathcal{L}(i)$.

In the case of adopting the single language masking strategy, since alignment neighbor nodes aligned with a masked node in another language node set are not masked, the representation obtaining model may at least recover the masked node through the representations of the alignment neighbor nodes. That is, this masking strategy may encourage the representation obtaining model to explore semantic associations through alignment relations, thereby learning text representations from semantic associations embedded in the alignment relations. In the case of adopting the cross-language masking strategy, since nodes aligned with a current node are also masked and alignment edges are cut off, the representation obtaining model is forced to use representations of dependency neighbor nodes to recover the current node, which may guide the representation obtaining model to learn text representations from semantic associations embedded in dependency relations.

It should be appreciated that the process 700 in FIG. 7 is only an example of a process for pre-training a representation obtaining model. According to the actual application requirements, the process for pre-training a representation obtaining model may comprise any other steps, and may comprise more or fewer steps. For example, although it is generally described in the above discussion that the masking operation at 706*a* may be performed in a part of the pre-training phase, and the masking operation at 706*b* may be performed in another part of the pre-training phase, according to actual application requirements, one of the masking operation at 706*a* and the masking operation at 706*b* may be enhanced, e.g., the masking operation at 706*a* may be performed in most of the pre-training phases, or the masking operation at 706*b* may be performed in most of the pre-training phases. In addition, the specific order or hierarchy of the steps in the process 700 is only exemplary, and the process for pre-training the representation obtaining model may be performed in an order different from the described one.

Figure 9:
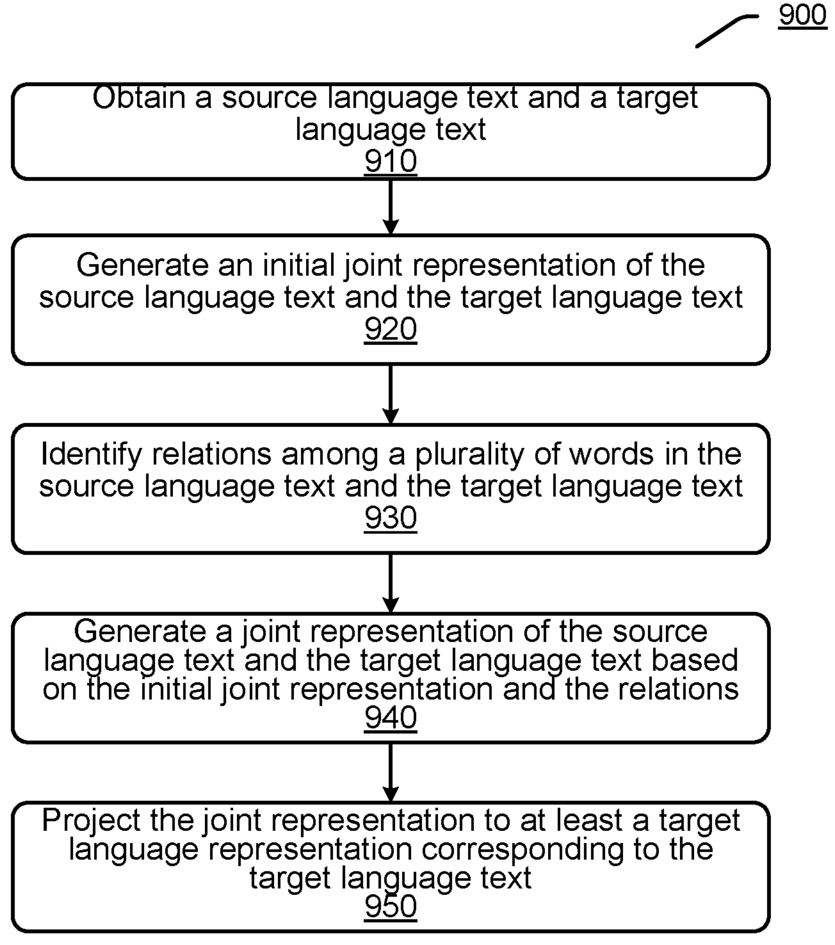
FIG. 9 is a flowchart of an exemplary method for representation learning of cross-language texts according to an embodiment of the present disclosure.

FIG. 9 is a flowchart of an exemplary method 900 for representation learning of cross-language texts according to an embodiment of the present disclosure.

At 910, a source language text and a target language text may be obtained.

At 920, an initial joint representation of the source language text and the target language text may be generated.

At 930, relations among a plurality of words in the source language text and the target language text may be identified.

At 940, a joint representation of the source language text and the target language text may be generated based on the initial joint representation and the relations.

At 950, the joint representation may be projected to at least a target language representation corresponding to the target language text.

In an implementation, the source language text may be obtained through translating the target language text, or the target language text may be obtained through translating the source language text.

In an implementation, the generating an initial joint representation may comprise: generating an initial source language representation of the source language text and an initial target language representation of the target language text; and combining the initial source language representation and the initial target language representation into the initial joint representation.

In an implementation, the source language text may include a set of source language words. The target language text may include a set of target language words. The identifying relations may comprise: identifying alignment relations between the set of source language words and the set of target language words; and/or identifying dependency relations among the set of source language words and dependency relations among the set of target language words.

In an implementation, the method 900 may further comprise: construct a graph corresponding to the source language text and the target language text based on the relations. The generating a joint representation may comprise: updating the initial joint representation to the joint representation based on the graph.

The constructing a graph may comprise: setting a set of source language words in the source language text and a set of target language words in the target language text as a plurality of nodes; determining a set of edges among the plurality of nodes based on the relations; and combining the plurality of nodes and the set of edges into the graph.

The determining a set of edges may comprise, for every two nodes in the plurality of nodes: determining whether there is a relation between two words corresponding to the two nodes; and in response to determining that there is a relation between the two words, determining an edge between the two nodes that corresponds to the relation.

The initial joint representation may be updated through iteratively performing an update operation. The update operation may comprise: obtaining current attention information based on the graph and a previous joint representation; and updating the previous joint representation to a current joint representation based on the current attention information.

The obtaining current attention information may comprise: calculating a current attention score corresponding to every two words in the source language text and the target language text based on the graph, to obtain a set of current attention scores; and combining the set of current attention scores into the current attention information.

The calculating a current attention score may comprise: obtaining a current word representation of each of the two words based at least on the graph; and calculating the current attention score based on two current word representations corresponding to the two words.

The obtaining a current word representation may comprise: obtaining a previous word representation corresponding to the word from the previous joint representation; identifying at least one neighbor node of a node corresponding to the word from the graph; and updating the previous word representation to the current word representation based at least on a representation of the at least one neighbor node.

The at least one neighbor node may include at least one alignment neighbor node having an alignment edge with the node. The updating the previous word representation may be further based on a semantic difference between the at least one alignment neighbor node and the node.

The at least one neighbor node may include at least one dependency neighbor node having a dependency edge with the node. The updating the previous word representation may be further based on an importance of the at least one dependency neighbor node relative to the node.

In an implementation, the joint representation may be generated through a representation obtaining model. The pre-training of the representation obtaining model may comprise at least: masking one or more nodes in only one node set of a source language node set corresponding to a source language text sample and a target language node set corresponding to a target language text sample; and for each node of the one or more nodes, recovering the node with at least a representation of at least one alignment neighbor node of the node.

In an implementation, the joint representation may be generated through a representation obtaining model. The pre-training of the representation obtaining model may comprise at least: masking one or more node pairs having alignment edges in a source language node set corresponding to a source language text sample and a target language node set corresponding to a target language text sample; and for each node of the one or more node pairs, recovering the node with a representation of at least one dependency neighbor node of the node.

The pre-training of the representation obtaining model may further comprise: recovering the node with a representation of the node.

In an implementation, the method 900 may further comprise: projecting the joint representation to a source language representation corresponding to the source language text.

It should be appreciated that the method 900 may further comprise any step/process for representation learning of cross-language texts according to the embodiments of the present disclosure described above.

Figure 10:
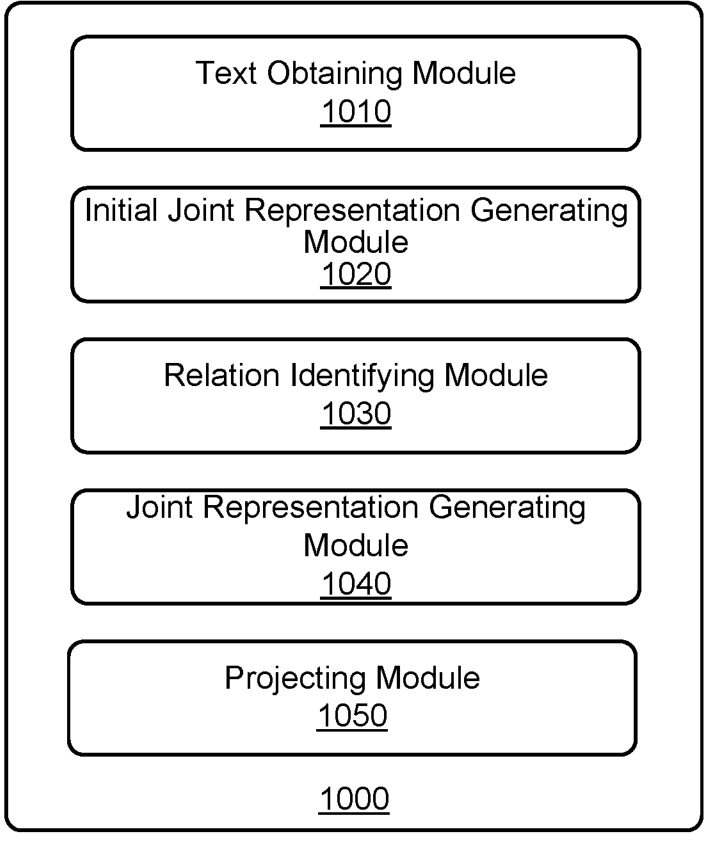
FIG. 10 illustrates an exemplary apparatus for representation learning of cross-language texts according to an embodiment of the present disclosure.

FIG. 10 illustrates an exemplary apparatus 1000 for representation learning of cross-language texts according to an embodiment of the present disclosure.

The apparatus 1000 may comprise: a text obtaining module 1010, for obtaining a source language text and a target language text; an initial joint representation generating module 1020, for generating an initial joint representation of the source language text and the target language text; a relation identifying module 1030, for identifying relations among a plurality of words in the source language text and the target language text; a joint representation generating module 1040, for generating a joint representation of the source language text and the target language text based on the initial joint representation and the relations; and a projecting module 1050, for projecting the joint representation to at least a target language representation corresponding to the target language text. Moreover, the apparatus 1000 may further comprise any other modules configured for representation learning of cross-language texts according to the embodiments of the present disclosure described above.

Figure 11:
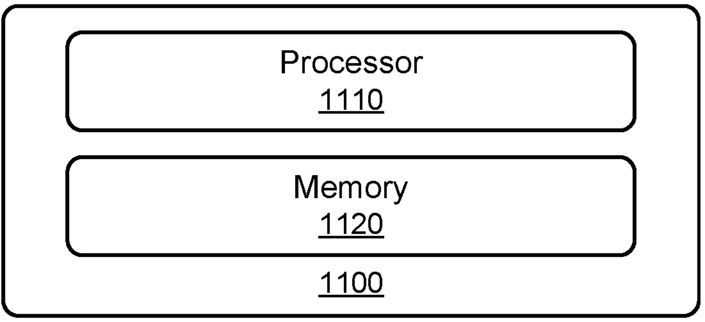
FIG. 11 illustrates an exemplary apparatus for representation learning of cross-language texts according to an embodiment of the present disclosure.

FIG. 11 illustrates an exemplary apparatus 1100 for representation learning of cross-language texts according to an embodiment of the present disclosure.

The apparatus 1100 may comprise at least one processor 1110 and a memory 1120 storing computer-executable instructions. The computer-executable instructions, when executed, may cause the at least one processor 1110 to: obtain a source language text and a target language text, generate an initial joint representation of the source language text and the target language text, identify relations among a plurality of words in the source language text and the target language text, generate a joint representation of the source language text and the target language text based on the initial joint representation and the relations, and project the joint representation to at least a target language representation corresponding to the target language text.

In an implementation, the computer-executable instructions, when executed, may further cause the at least one processor 1110 to: construct a graph corresponding to the source language text and the target language text based on the relations. The generating a joint representation may comprise: updating the initial joint representation to the joint representation based on the graph.

It should be appreciated that the processor 1110 may further perform any other step/process of the methods for representation learning of cross-language texts according to the embodiments of the present disclosure described above.

The embodiments of the present disclosure propose a computer program product for representation learning of cross-language texts, comprising a computer program that is executed by at least one processor for: obtaining a source language text and a target language text; generating an initial joint representation of the source language text and the target language text; identifying relations among a plurality of words in the source language text and the target language text; generating a joint representation of the source language text and the target language text based on the initial joint representation and the relations; and projecting the joint representation to at least a target language representation corresponding to the target language text. In addition, the computer programs may further be performed for implementing any other step/process of the methods for representation learning of cross-language texts according to the embodiments of the present disclosure described above.

The embodiments of the present disclosure may be embodied in non-transitory computer-readable medium. The non-transitory computer readable medium may comprise instructions that, when executed, cause one or more processors to perform any operation of a method for representation learning of cross-language texts according to embodiments of the present disclosure as described above.

It should be appreciated that all the operations in the methods described above are merely exemplary, and the present disclosure is not limited to any operations in the methods or sequence orders of these operations, and should cover all other equivalents under the same or similar concepts. In addition, the articles "a" and "an" as used in this description and appended claims, unless otherwise specified or clear from the context that they are for the singular form, should generally be interpreted as meaning "one" or "one or more."

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functions of a processor, any portion of a processor, or any combination of processors presented in this disclosure may be implemented with software executed by a microprocessor, a microcontroller, a DSP, or other suitable platforms.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, e.g., memory, the memory may be e.g., a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although a memory is shown separate from a processor in the various aspects presented throughout the present disclosure, the memory may be internal to the processor, e.g., a cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are expressly incorporated herein and encompassed by the claims.

The invention claimed is:

1. A method for representation learning of cross-language texts, comprising:

obtaining a source language text and a target language text;

generating an initial joint representation of the source language text and the target language text;

identifying relations among a plurality of words in the source language text and the target language text;

constructing a graph corresponding to the source language text and the target language text based on the relations, wherein the graph comprises alignment edges between source language word nodes and target language word nodes and dependency edges among word nodes within a same language;

generating a joint representation of the source language text and the target language text based on the initial joint representation and the relations by updating the initial joint representation based on the graph, wherein generating the joint representation comprises obtaining attention information based on the graph, the attention information encoding differentiated contributions from alignment neighbor nodes connected by the alignment edges and dependency neighbor nodes connected by the dependency edges, wherein a contribution from an alignment neighbor node is determined based on a semantic difference between the alignment neighbor node and a current node, and a contribution from a dependency neighbor node is determined based on an importance of the dependency neighbor node relative to the current node;

projecting the joint representation to at least a target language representation corresponding to the target language text; and pre-training a representation obtaining model by:

masking one or more nodes in a node set of a source language node set corresponding to a source language text sample and a target language node set corresponding to a target language text sample in the graph constructed based on the relations;

for each masked node, recovering the node with at least a representation of at least one neighbor node of the node;

computing a recovery loss based on the recovery of the masked node; and updating parameters of the representation obtaining model by minimizing the recovery loss.

2. The method of claim 1, wherein the source language text includes a set of source language words, the target language text includes a set of target language words, and the identifying relations comprises:

identifying alignment relations between the set of source language words and the set of target language words; and/or identifying dependency relations among the set of source language words and dependency relations among the set of target language words.

3. The method of claim 1, wherein the constructing a graph comprises:

setting a set of source language words in the source language text and a set of target language words in the target language text as a plurality of nodes;

determining a set of edges among the plurality of nodes based on the relations; and combining the plurality of nodes and the set of edges into the graph.

4. The method of claim 1, wherein the initial joint representation is updated through iteratively performing an update operation, the update operation comprising:

obtaining current attention information based on the graph and a previous joint representation; and updating the previous joint representation to a current joint representation based on the current attention information.

5. The method of claim 4, wherein the obtaining current attention information comprises:

calculating a current attention score corresponding to every two words in the source language text and the target language text based on the graph, to obtain a set of current attention scores; and combining the set of current attention scores into the current attention information.

6. The method of claim 5, wherein the calculating a current attention score comprises:

obtaining a current word representation of each of the two words based at least on the graph; and calculating the current attention score based on two current word representations corresponding to the two words.

7. The method of claim 6, wherein the obtaining a current word representation comprises:

obtaining a previous word representation corresponding to the word from the previous joint representation;

identifying at least one neighbor node of a node corresponding to the word from the graph; and updating the previous word representation to the current word representation based at least on a representation of the at least one neighbor node.

8. The method of claim 7, wherein the at least one neighbor node includes at least one alignment neighbor node having an alignment edge with the node, and the updating the previous word representation is further based on a semantic difference between the at least one alignment neighbor node and the node.

9. The method of claim 7, wherein the at least one neighbor node includes at least one dependency neighbor node having a dependency edge with the node, and the updating the previous word representation is further based on an importance of the at least one dependency neighbor node relative to the node.

10. The method of claim 1, wherein the joint representation is generated through a representation obtaining model, pre-training of the representation obtaining model comprising at least:

masking one or more nodes in only one node set of a source language node set corresponding to a source language text sample and a target language node set corresponding to a target language text sample; and for each node of the one or more nodes, recovering the node with at least a representation of at least one alignment neighbor node of the node.

11. The method of claim 1, wherein the joint representation is generated through a representation obtaining model, pre-training of the representation obtaining model comprising at least:

masking one or more node pairs having alignment edges in a source language node set corresponding to a source language text sample and a target language node set corresponding to a target language text sample; and for each node of the one or more node pairs, recovering the node with a representation of at least one dependency neighbor node of the node.

12. The method of claim 10, wherein the pre-training of the representation obtaining model further comprises:

recovering the node with a representation of the node.

13. An apparatus for representation learning of cross-language texts, comprising:

at least one processor; and a memory storing computer-executable instructions that, when executed, cause the at least one processor to:

obtain a source language text and a target language text;

generate an initial joint representation of the source language text and the target language text;

identify relations among a plurality of words in the source language text and the target language text;

construct a graph corresponding to the source language text and the target language text based on the relations, wherein the graph comprises alignment edges between source language word nodes and target language word nodes and dependency edges among word nodes within a same language;

generate a joint representation of the source language text and the target language text based on the initial joint representation and the relations by updating the initial joint representation based on the graph, wherein generating the joint representation comprises obtaining attention information based on the graph, the attention information encoding differentiated contributions from alignment neighbor nodes connected by the alignment edges and dependency neighbor nodes connected by the dependency edges, wherein a contribution from an alignment neighbor node is determined based on a semantic difference between the alignment neighbor node and a current node, and a contribution from a dependency neighbor node is determined based on an importance of the dependency neighbor node relative to the current node;

project the joint representation to at least a target language representation corresponding to the target language text; and pre-training a representation obtaining model by:

masking one or more nodes in a node set of a source language node set corresponding to a source language text sample and a target language node set corresponding to a target language text sample in a graph constructed based on the relations;

for each masked node, recovering the node with at least a representation of at least one neighbor node of the node;

computing a recovery loss based on the recovery of the masked node; and updating parameters of the representation obtaining model by minimizing the recovery loss.

14. At least one non-transitory machine-readable medium comprising instructions for representation learning of cross-language texts that, when executed by at least one processor, cause the at least one processor to perform operations to:

obtaining a source language text and a target language text;

generating an initial joint representation of the source language text and the target language text;

identifying relations among a plurality of words in the source language text and the target language text;

constructing a graph corresponding to the source language text and the target language text based on the relations, wherein the graph comprises alignment edges between source language word nodes and target language word nodes and dependency edges among word nodes within a same language;

generating a joint representation of the source language text and the target language text based on the initial joint representation and the relations by updating the initial joint representation based on the graph, wherein generating the joint representation comprises obtaining attention information based on the graph, the attention information encoding differentiated contributions from alignment neighbor nodes connected by the alignment edges and dependency neighbor nodes connected by the dependency edges, wherein a contribution from an alignment neighbor node is determined based on a semantic difference between the alignment neighbor node and a current node, and a contribution from a dependency neighbor node is determined based on an importance of the dependency neighbor node relative to the current node;

project the joint representation to at least a target language representation corresponding to the target language text; and pre-training a representation obtaining model by:

masking one or more nodes in a node set of a source language node set corresponding to a source language text sample and a target language node set corresponding to a target language text sample in a graph constructed based on the relations;

for each masked node, recovering the node with at least a representation of at least one neighbor node of the node;

computing a recovery loss based on the recovery of the masked node; and updating parameters of the representation obtaining model by minimizing the recovery loss.

15. The at least one non-transitory machine-readable medium of claim 14, wherein the source language text includes a set of source language words, the target language text includes a set of target language words, and the instructions to identify relations further comprising instructions to:

identify alignment relations between the set of source language words and the set of target language words; and/or identify dependency relations among the set of source language words and dependency relations among the set of target language words.

16. The at least one non-transitory machine-readable medium of claim 14, the instructions to construct a graph further comprising instructions to:

set a set of source language words in the source language text and a set of target language words in the target language text as a plurality of nodes;

determine a set of edges among the plurality of nodes based on the relations; and combine the plurality of nodes and the set of edges into the graph.

17. The at least one non-transitory machine-readable medium of claim 14, wherein the initial joint representation is updated using instructions to iteratively perform an update operation, the instructions for the update operation comprising instructions to:

obtain current attention information based on the graph and a previous joint representation; and update the previous joint representation to a current joint representation based on the current attention information.

18. The at least one non-transitory machine-readable medium of claim 17, the instructions to obtain current attention information further comprising instructions to:

calculate a current attention score corresponding to every two words in the source language text and the target language text based on the graph, to obtain a set of current attention scores; and combine the set of current attention scores into the current attention information.

* * * * *